No. 855,468. PATENTED JUNE 4, 1907.
T. MIDGLEY.
WHEEL TIRE.
APPLICATION FILED OCT. 6, 1905.
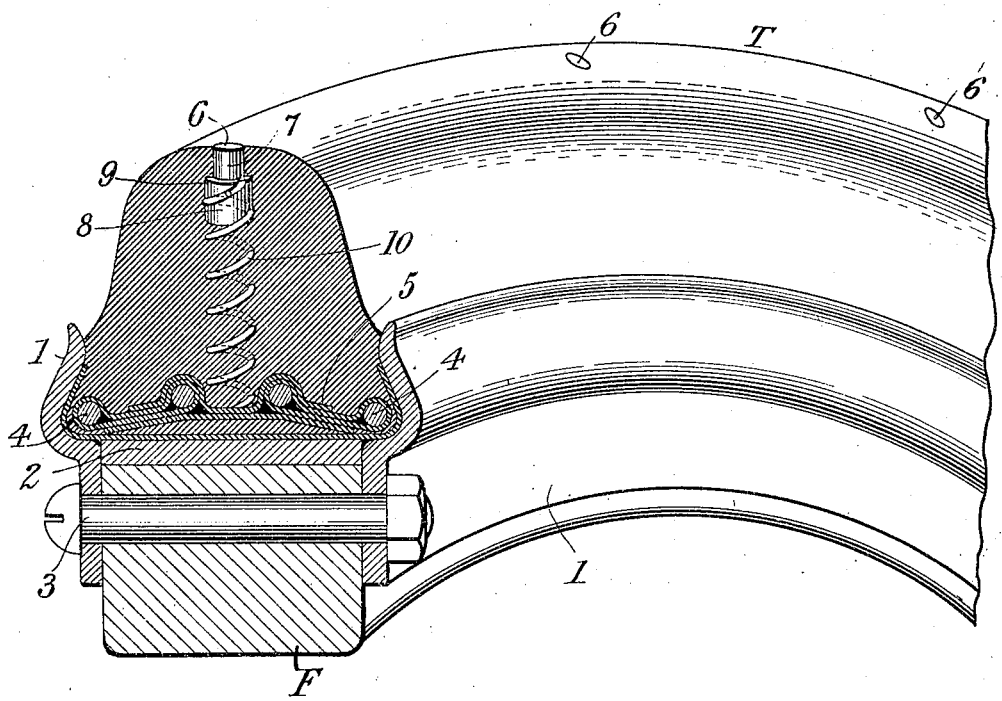
Witnesses
Raphael Netter
Baxter Morton
Thomas Midgley Inventor
By his Attorney Ernest Hopkins

UNITED STATES PATENT OFFICE.

THOMAS MIDGLEY, OF HARTFORD, CONNECTICUT.

WHEEL-TIRE.

No. 855,468.　　　　　　Specification of Letters Patent.　　　　　Patented June 4, 1907.

Application filed October 6, 1905. Serial No. 281,573.

*To all whom it may concern:*

Be it known that I, THOMAS MIDGLEY, a citizen of the United States, and a resident of the city of Hartford, county of Hartford, and State of Connecticut, have invented new and useful Improvements in Wheel-Tires, of which the following is a specification.

This invention relates to tires for vehicle wheels, and more particularly to solid tires of resilient material, such as rubber, the principal object of the invention being to provide a tire of this description which is characterized by a tread surface adapted to obtain a better hold upon pavements and roadbeds than is possible with a tire presenting a tread surface composed wholly of rubber.

Stated in general terms, the invention consists in the provision in the tread of a rubber tire of the solid or cushion type, of a plurality of pieces of metal which are normally flush with the surface of the tire and are so mounted in the tire that they will not lessen its resiliency or its durability.

In the accompanying drawing forming part of this specification, I have illustrated a solid tire which is provided with studs of steel or iron set in the rubber of the tire adjacent to the tread and having the outer ends thereof flush with the tread surface.

Referring to the drawing by the reference characters, F designates the felly of the wheel at the sides of which are secured side flanges 1 of metal, and on the periphery of which is shrunk or other wise secured a metal band 2. The side flanges 1 are held in place by transverse bolts 3 extending through the side flanges and the felly. In the channel presented between the outer portions of the side flanges 1, the tire T is held. This tire may be secured in place in any suitable manner, but in the tire which is used for purposes of illustration the securing means comprises a plurality of circumferential wires 4 embedded in the base of the tire and inclosed within a sort of sheath 5 of textile fabric. These features of the tire construction are well known in the art and form no part of the present invention.

In the body of the tire at suitable intervals, a plurality of studs 6 are set. These studs consist preferably of an outer portion 7 of relatively small diameter and an inner or base portion 8 of larger diameter, a shoulder 9 being presented at the outer end of the base portion which serves to prevent the extrusion of the stud beyond the tread surface of the tire. Each stud is mounted upon a coil spring 10 which is embedded in the rubber of the tire and extends almost, if not quite, to the base of the tire. Each stud is connected with the corresponding spring by simply cutting a groove spirally in the outer surface of the inner or base portion of the stud so that the base of the stud forms a short screw which may be screwed into the outer end of the spring. This screw connection between the studs and the supporting springs permits a certain amount of adjustment of the studs relative to the supporting springs, as will be obvious.

When the tire constructed as above described is in use, a composite surface of rubber and metal is presented for contact with the surface of the roadway and, if the roadbed be coated with mud or other soft material, the rubber will be compressed slightly around the outer portions of the studs which will be protruded to a slight extent and will bite into the soft coating on the roadway. The amount of protrusion of the studs will always be small, as the portion of the tire under the weight of the vehicle will, of course, be accompanied by compression of the springs upon which the studs are mounted and there will be substantially no movement of the stud as an entirety relative to the body of the tire. On hard and smooth roadbeds, such as asphalt and stone pavements, there will be no protrusion of the studs beyond the tread surface of the tire, but the tendency of the tire to slip on the surface will be diminished somewhat by the increased friction which is due to the studs. This increase of friction is particularly noticeable when the roadway is wet and the tendency of the rubber to slip is much greater than it is on a dry surface.

A special feature of the invention is the thoroughly yieldable support afforded for each stud by the coil spring in which it is mounted. As these springs are not only susceptible of compression but of lateral distortion, any movement imparted to the tread of the tire will be communicated to the studs and there will be no tendency of the studs to distend and enlarge the cavities in which they are seated, as would be the case if the studs were rigidly secured in position.

While I have described and shown a solid tire only in this specification, it will be obvious that studs of the character illustrated may be embedded in cushion tires in like manner; and it will also be clear that the number and position of the studs may be varied at will without departing from the spirit of the invention.

Having thus described my invention, what I claim as new and desire to secure by Letters Patent is:

1. A solid tire of elastic or resilient material provided at the tread with a plurality of studs of harder material than the body of the tire set in the material of which the tire is formed and mounted on yielding supporting members extending toward the base of the tire and embedded in the resilient material of the tire.

2. A tire of elastic or resilient material provided at its tread surface with studs set in the material of which the tire is composed and mounted on coil springs extending toward the base of the tire.

3. A tire of elastic or resilient material having studs set in the material of which the tire is composed and having their outer ends substantially flush with the tread surface of the tire, said studs being mounted on metallic supports yieldable in all directions.

4. A solid tire of elastic or resilient material provided with a plurality of coiled springs embedded in the material of the tire and extending from the base of the tire toward the tread thereof.

In testimony whereof, I have signed my name in the presence of two witnesses.

THOMAS MIDGLEY.

Witnesses:
J. BOSSEN,
F. D. RATHBUN.